(12) United States Patent
Kruempelmann et al.

(10) Patent No.: US 12,141,170 B1
(45) Date of Patent: Nov. 12, 2024

(54) AUTOMATED VERSIONING OF CONFIGURATION TABLES WITH ROLLBACK

(71) Applicant: SAP SE, Walldorf (DE)

(72) Inventors: Wulf Kruempelmann, Altlussheim (DE); Susanne Schott, Walldorf (DE)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 18/469,726

(22) Filed: Sep. 19, 2023

(51) Int. Cl.
*G06F 16/28* (2019.01)
*G06F 16/21* (2019.01)
*G06F 16/22* (2019.01)

(52) U.S. Cl.
CPC .......... *G06F 16/284* (2019.01); *G06F 16/219* (2019.01); *G06F 16/2282* (2019.01)

(58) Field of Classification Search
CPC ... G06F 16/284; G06F 16/219; G06F 16/2285
See application file for complete search history.

(56) References Cited

U.S. PATENT DOCUMENTS

2020/0110792 A1\* 4/2020 Tsabba .................... G06F 3/167
2020/0110796 A1\* 4/2020 Tsabba ...................... G06F 8/38

\* cited by examiner

*Primary Examiner* — Baoquoc N To
(74) *Attorney, Agent, or Firm* — Mintz Levin Cohn Ferris Glovsky and Popeo, P.C.

(57) ABSTRACT

Arrangements for automated versioning of configuration tables with the ability of automated rollback are provided. A database table having key fields and data fields may be retrieved. The table may be extended by adding a new key field to each row of the database table. The new key field may include a version number and a data block identifier. A view of the table may be generated and initialized by setting a current version number to zero. One or more triggering components for simulating a versioned database may be defined. The one or more triggering components may include one or more instead-of triggers used to insert, update, or delete from the database table upon an insert, update, or delete operation on the view. The versioned database may be simulated using the one or more triggering components, including an instead-of-insert trigger, an instead-of-update trigger, and/or an instead-of-delete trigger.

20 Claims, 8 Drawing Sheets

AUTOMATED VERSIONING OF CONFIGURATION TABLES WITH ROLLBACK

TECHNICAL FIELD

The subject matter described herein relates generally to data processing and more specifically to automated versioning of configuration tables with rollback.

BACKGROUND

Relatively large scale development of enterprise processes might include hundreds of thousands of tables and, in case of error, a large block must be rolled back. In many instances, it may be difficult to perform the roll back because conventional relational database tables are not versioned and a rollback of larger blocks of a transaction is not automatically supported.

SUMMARY

Methods, systems, and articles of manufacture, including computer program products, are provided for automated versioning of configuration tables with the ability of automated rollback. In one aspect, there is provided a system including at least one processor and at least one memory. The at least one memory can store instructions that cause operations when executed by the at least one processor. The operations may include: retrieving a database table including a dataset having key fields and data fields; extending the database table by adding a new key field to each row of the database table, and the new key field includes a version number and a data block identifier; generating a view of the database table, and the view is a relation defined in terms of stored base tables; initializing the view of the database table by setting a current version number to zero; defining one or more triggering components for simulating a versioned database, and the one or more triggering components include one or more instead-of triggers used to insert, update, or delete from the database table upon an insert, update, or delete operation on the view; and simulating the versioned database using the one or more triggering components, including executing a first instead-of trigger for updating data in the dataset, via the view, by: incrementing each version number in a dataset by one, adding a new version number zero to the dataset, and inserting new data to the database table.

In some variations, one or more of the features disclosed herein including the following features can optionally be included in any feasible combination. In some variations, the method may further include executing a second instead-of trigger for inserting data into the database table via the view by adding a version number zero to the dataset, and inserting the data to the database table.

In some variations, the method may further include executing a third instead-of trigger for deleting data in the database table via the view by incrementing each version number in the dataset by one.

In some variations, the method may further include returning a data block to a previous state by: retrieving view and key information from the data block; and for each view and key set in the data block, deleting the dataset with version number zero and reduce the version number of each entry in the dataset by one.

In some variations, each row of the database table may be associated with a different version number.

In some variations, the key fields may identify unique records in a data store.

In some variations, the data block identifier may uniquely identify an associated data block in a data repository.

In some variations, the database table may include a relational database table.

In another aspect, there is provided a method for centralized configuration of enterprise software applications. The method may include: retrieving a database table including a dataset having key fields and data fields; extending the database table by adding a new key field to each row of the database table, and the new key field includes a version number and a data block identifier; generating a view of the database table, and the view is a relation defined in terms of stored base tables; initializing the view of the database table by setting a current version number to zero; defining one or more triggering components for simulating a versioned database, and the one or more triggering components include one or more instead-of triggers used to insert, update, or delete from the database table upon an insert, update, or delete operation on the view; and simulating the versioned database using the one or more triggering components, including executing a first instead-of trigger for updating data in the dataset, via the view, by: incrementing each version number in a dataset by one, adding a new version number zero to the dataset, and inserting new data to the database table.

In some variations, one or more of the features disclosed herein including the following features can optionally be included in any feasible combination. The method may further include executing a second instead-of trigger for inserting data into the database table via the view by adding a version number zero to the dataset, and inserting the data to the database table.

In some variations, the method may further include executing a third instead-of trigger for deleting data in the database table via the view by incrementing each version number in the dataset by one.

In some variations, the method may further include returning a data block to a previous state by: retrieving view and key information from the data block; and for each view and key set in the data block, deleting the dataset with version number zero and reduce the version number of each entry in the dataset by one.

In some variations, each row of the database table may be associated with a different version number.

In some variations, the key fields may identify unique records in a data store.

In some variations, the data block identifier may uniquely identify an associated data block in a data repository.

In some variations, the database table may include a relational database table.

In another aspect, there is provided a computer program product that includes a non-transitory computer readable storage medium. The non-transitory computer readable storage medium may store instructions that cause operations when executed by at least one data processor. The operations may include: retrieving a database table including a dataset having key fields and data fields; extending the database table by adding a new key field to each row of the database table, and the new key field includes a version number and a data block identifier; generating a view of the database table, and the view is a relation defined in terms of stored base tables; initializing the view of the database table by setting a current version number to zero; defining one or more triggering components for simulating a versioned database, and the one or more triggering components include one or more instead-of triggers used to insert, update, or delete from the database table upon an insert, update, or delete operation on the view; and simulating the versioned database using the one or more triggering components, including executing a first instead-of trigger for updating data in the dataset, via the view, by: incrementing each version number in a dataset by one, adding a new version number zero to the dataset, and inserting new data to the database table.

In some variations, one or more of the features disclosed herein including the following features can optionally be included in any feasible combination. The non-transitory computer readable storage medium may store instructions that that cause operations further including: executing a second instead-of trigger for inserting data into the database table via the view by adding a version number zero to the dataset; and inserting the data to the database table.

In some variations, the non-transitory computer readable storage medium may store instructions that that cause operations further including executing a third instead-of trigger for deleting data in the database table via the view by incrementing each version number in the dataset by one.

In some variations, the non-transitory computer readable storage medium may store instructions that that cause operations further including retrieving view and key information from the data block; and for each view and key set in the data block, deleting the dataset with version number zero and reduce the version number of each entry in the dataset by one.

Implementations of the current subject matter can include methods consistent with the descriptions provided herein as well as articles that comprise a tangibly embodied machine-readable medium operable to cause one or more machines (e.g., computers, etc.) to result in operations implementing one or more of the described features. Similarly, computer systems are also described that may include one or more processors and one or more memories coupled to the one or more processors. A memory, which can include a non-transitory computer-readable or machine-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes, it should be readily understood that such features are not intended to be limiting. The claims that follow this disclosure are intended to define the scope of the protected subject matter.

BRIEF DESCRIPTION OF THE DRAWINGS

The accompanying drawings, which are incorporated in and constitute a part of this specification, show certain aspects of the subject matter disclosed herein and, together with the description, help explain some of the principles associated with the disclosed implementations. In the drawings.

Figure 1:
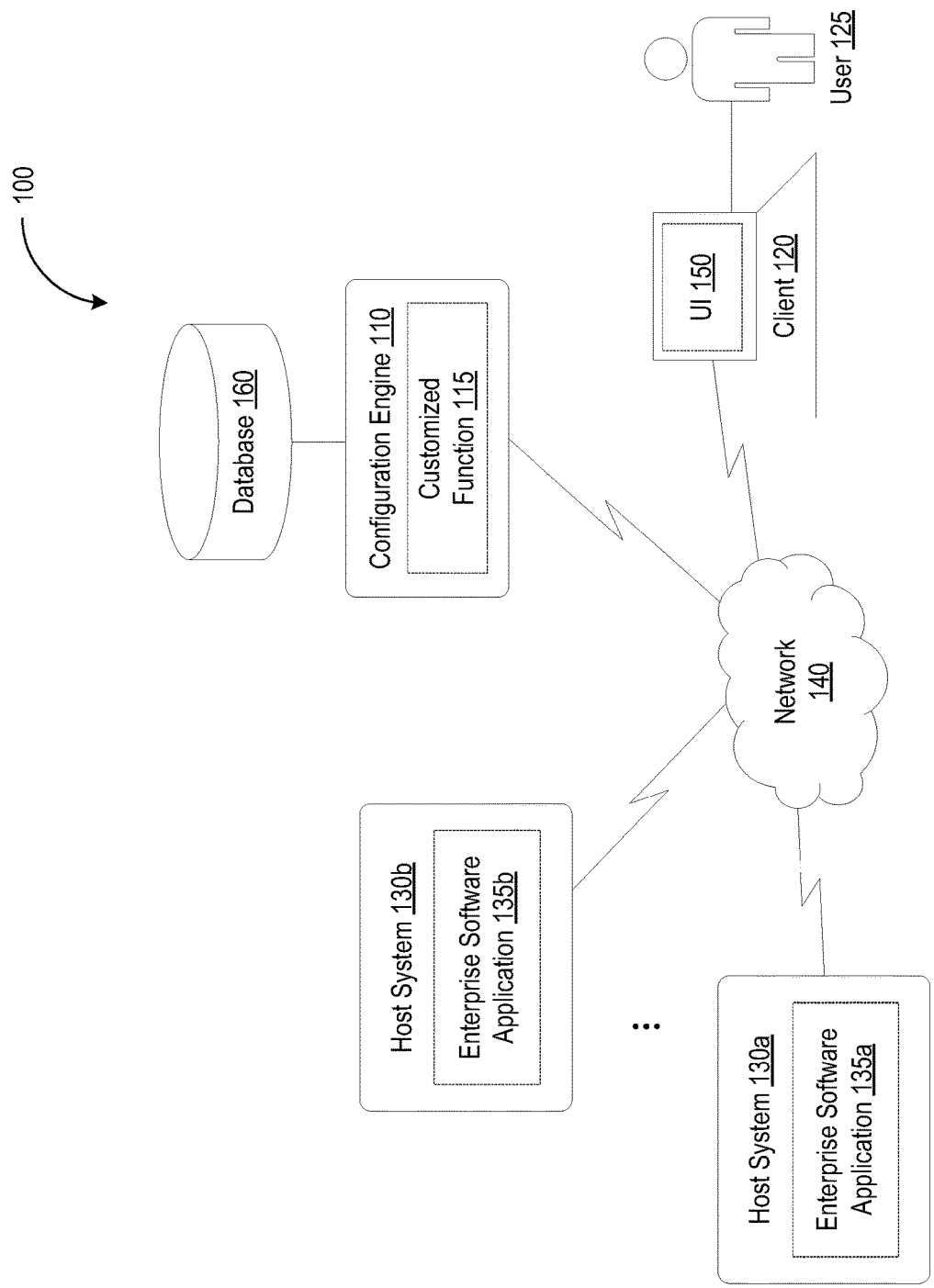
FIG. 1 depicts an illustrative computing environment for automated versioning of configuration tables with rollback in accordance with some example embodiments.

When practical, like labels are used to refer to same or similar items in the drawings.

DETAILED DESCRIPTION

Aspects of the disclosure provide automatic versioning of configuration tables with the ability for automated rollback. More specifically, aspects of the disclosure use database triggers and views to simulate a versioned database. Additional aspects of the disclosure use block wise recording for block rollback. These and various other arrangements will be discussed more fully below.

FIG. 1 depicts a system diagram illustrating a configuration system 100, in accordance with some example embodiments. Referring to FIG. 1, the configuration system 100 may include a configuration engine 110 and a client 120. The configuration system 100 may further include a plurality of host systems including, for example, a first host system 130a, a second host system 130b, and/or the like. As shown in FIG. 1, the configuration engine 110, the client 120, the first host system 130a, and the second host system 130b may be communicatively coupled via a network 140. The network 140 may be a wired and/or wireless network including, for example, a wide area network (WAN), local area network (LAN), a virtual local area network (VLAN), the Internet, and/or the like. Meanwhile, the first host system 130a and/or the second host system 130b may be cloud-based systems hosted on one or more cloud-computing platforms.

In some example embodiments, the configuration engine 110 may be centralize the configuration of multiple enterprise software applications, including enterprise software applications distributed across different host systems. For example, as shown in FIG. 1, a user 125 at the client 120 may interact with the configuration engine 110 in order to customize a first enterprise software application 135a deployed at the first host system 130a as well as a second enterprise software application 135b deployed at the second host system 130b. The first enterprise software application 135a and/or the second enterprise software application 135b may be an enterprise resource planning (ERP) software application, a customer relationship management (CRM) software application, and/or the like. The user 125 may customize the first enterprise software application 135a and the second enterprise software application 135b in order to implement a customized function 115 requiring the first enterprise software application 135a as well as the second enterprise software application 135b.

In some example embodiments, in order to implement the customized function 115, the user 125 may interact with the configuration engine 110 via a user interface 150 presented at the client 120. The user interface 150 may be configured to receive, from the user 125, one or more inputs scoping the customized function 115. For example, the user interface 150 may be configured to receive, from the user 125 at the client 120, a first input selecting a function. Moreover, the user interface 150 may be configured to receive, from the user 125 at the client 120, a second input specifying one or more customizations that are applied to the selected function to generate the customized function 115. It should be appreciated that the configuration engine 110 may be configured to generate a series of queries for scoping the customized function 115. As such, the first input and/or the second input may be responses to the queries generated by the configuration engine 110 and displayed at the user interface 150.

Examples of the customized function 115 may include billing, invoicing, procurement, payroll, time and attendance management, recruiting and onboarding, learning and development, performance and compensation, and workforce planning. In order to accomplish the customized function 115, the first enterprise software application 135a and the second enterprise software application 135b may operate on the same data. Accordingly, the first enterprise software application 135a and the second enterprise software application 135b may each be implemented based on a template. The template may define the manner in which data is stored in one or more database tables operated upon by the first enterprise software application 135a and the second enterprise software application 135b while performing the customized function 115. For instance, the template may specify the columns that form the entries occupying the rows in each one of the database tables operated upon by the first enterprise software application 135a and the second enterprise software application 135b while performing the customized function 115.

In some example embodiments, the configuration engine 110 may maintain (e.g., store) configuration data (e.g., for an enterprise software application 135a, 135b) in one or more database tables at a database 160 coupled with the configuration engine 110.

Figure 2A:
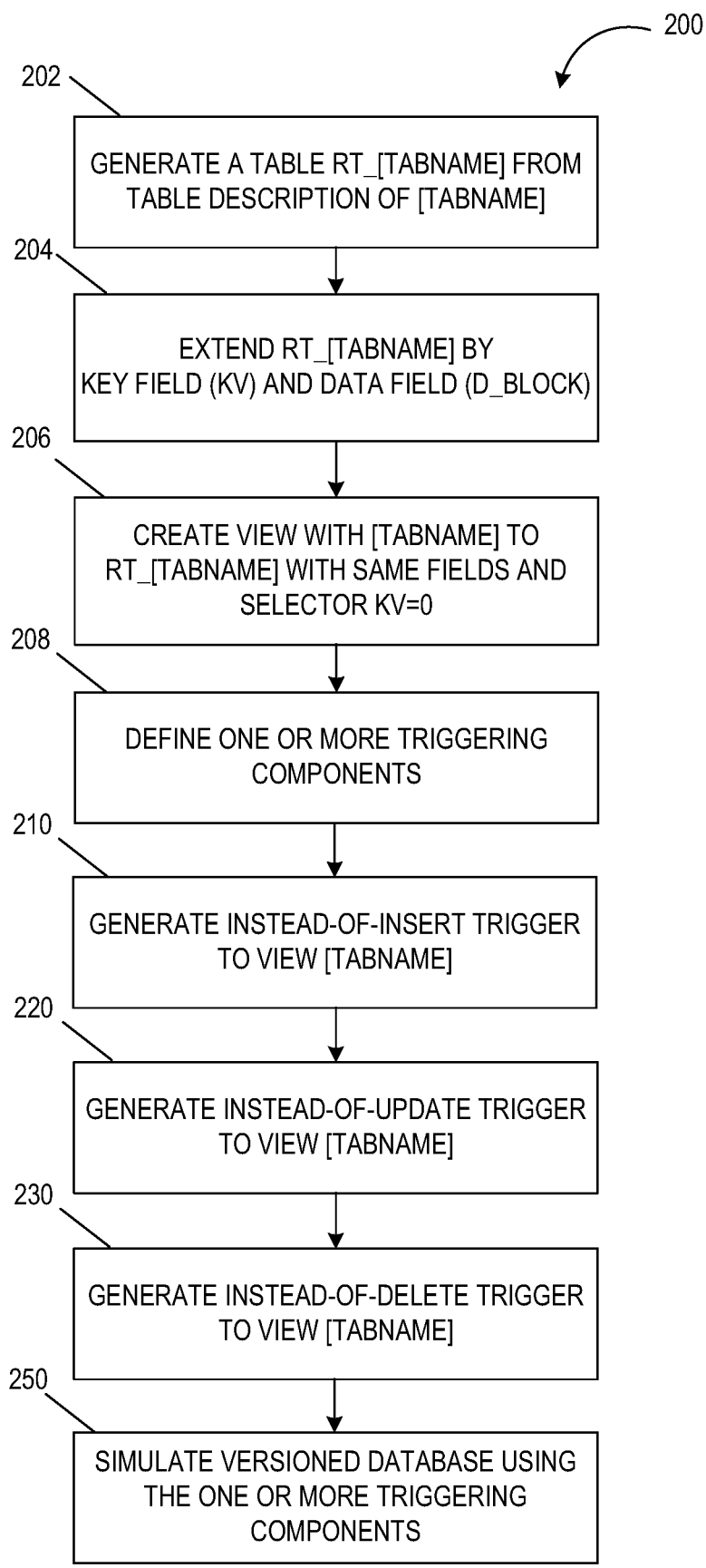
FIG. 2A depicts a flowchart illustrating a process for implementing automated versioning of configuration tables with rollback, in accordance with some example embodiments.
Figure 2B:
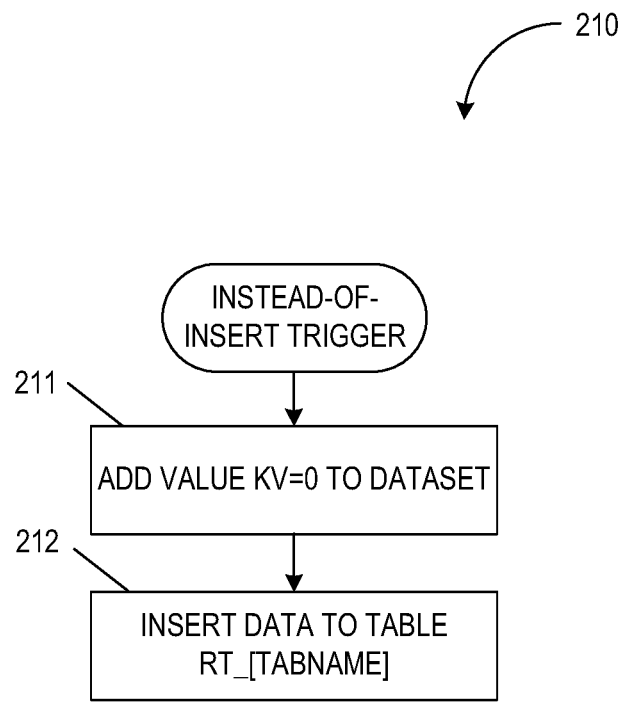
FIG. 2B depicts a flowchart illustrating a process for implementing a triggering component associated with automated versioning of configuration tables with rollback, in accordance with some example embodiments.
Figure 2C:
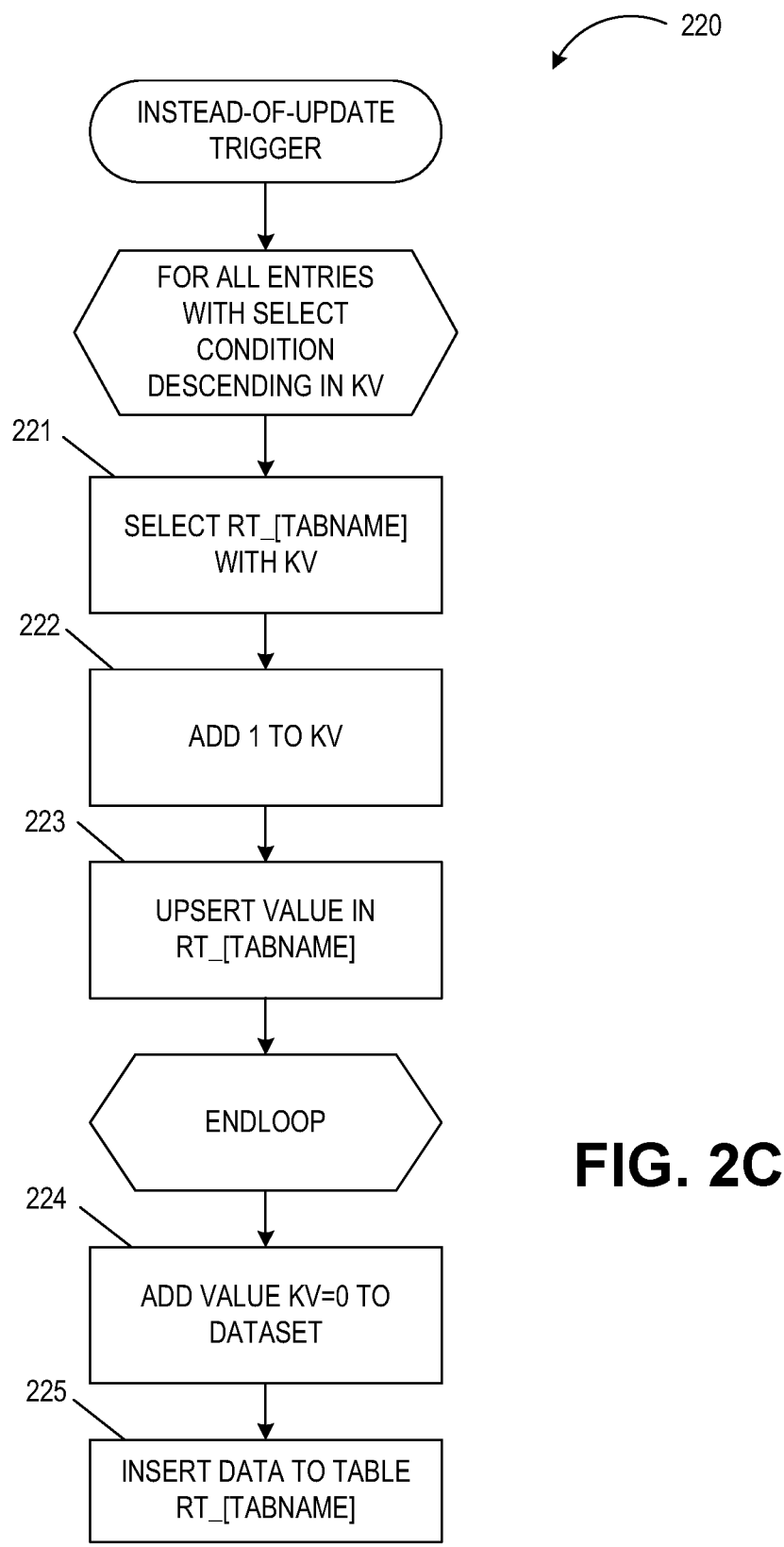
FIG. 2C depicts a flowchart illustrating a process for implementing a triggering component associated with automated versioning of configuration tables with rollback, in accordance with some example embodiments.
Figure 2D:
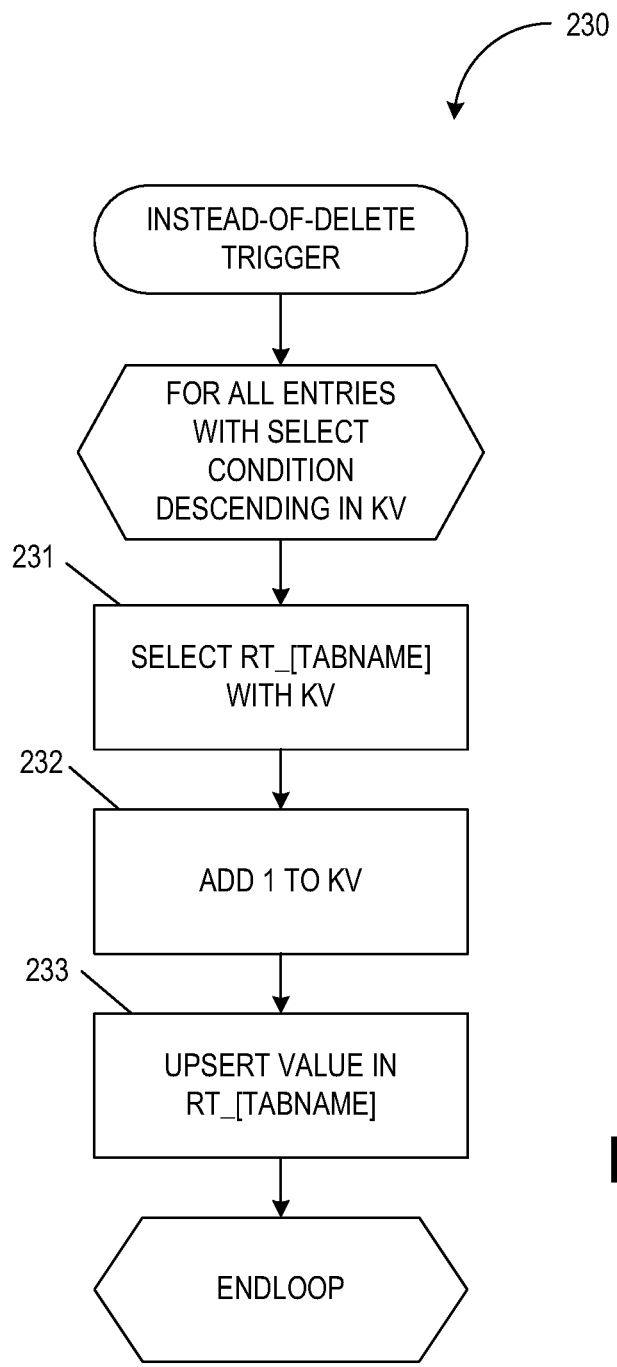
FIG. 2D depicts a flowchart illustrating a process for implementing a triggering component associated with automated versioning of configuration tables with rollback, in accordance with some example embodiments.

FIG. 2A depicts a flowchart 200 illustrating a process for implementing automated versioning of configuration tables with rollback. Referring to FIG. 2A, at step 202, the configuration engine 110 may generate a table from a table description. For example, the configuration engine 110 may retrieve a database table (e.g., [TABNAME]) comprising a dataset including key fields (e.g., k1, k2, k3, identifying unique records) and data fields (e.g., d1, d2, d3). Then, the configuration engine 110 may replace the database table with another database table (e.g., rename the table [TABNAME] to table RT_[TABNAME]). The database table may be and/or include a relational database table.

At step 204, the configuration engine 110 may extend the database table by adding a new key field to each row of the database table. For example, the configuration engine 110 may add a new key field that includes a version number (e.g., key version, KV) and a data block identifier (e.g., D_BLOCK). Each row of the database table may be associated with a different version number. The data block identifier, also called a transport key, may uniquely identify an associated data block in a data repository that enables an application to find it later. The unique identifiers may be stored in a data lookup table.

At step 206, the configuration engine 110 may generate or otherwise create a database view of the database table (e.g., view with T1 to RT_T1) with the same fields (e.g., key fields k1, k2, k3; data fields d1, d2, d3) and selector KV=0, thereby initializing the view of the database table by setting a current/actual version number to zero (e.g., KV=0). As used herein, a "database view" may be a searchable object in the database (e.g., database 160) that includes a result of a query on the database (e.g., database 160). A "database view" does not store any data but may nevertheless operate akin to a "virtual table" in that the "database view" itself may be queried. The view is, for example, a relation defined in terms of stored base tables (e.g., [TABNAME]). Each line of the table may have its own version number. The view automatically selects the actual version with version number zero (e.g., KV=0).

Thereafter, at step 208, the configuration engine 110 may define and execute one or more triggering components (e.g., "INSTEAD OF" trigger) for simulating a versioned database. For example, an instead-of trigger is a Structure Query Language (SQL) statement/trigger that is processed "instead of" an SQL update, delete, or insert statement. The instead-of trigger is defined on a view and allows a view to be inserted into, updated, or deleted from. After an instead-of trigger is added to a view, the view which previously could only be read from can be used as a target of an insert, update, or delete operation. The one or more triggering components may include one or more instead-of triggers used to insert/write, update, or delete from the database table upon an insert, update, or delete operation on the view.

To further illustrate, FIGS. 2B-2E depicts example processes 210, 220, 230, and 240 for implementing triggering components associated with automated versioning of configuration tables with rollback, in accordance with some example embodiments.

In some embodiments, at step 210, the configuration engine 110 may generate or add an instead-of-insert trigger to the view. For example, referring to FIG. 2B, the configuration engine 110 may execute an instead-of-insert trigger for inserting data into the database table via the view by adding a version number zero (e.g., KV=0) to the dataset at step 211 and inserting the data to the database table at step 212.

Additionally or alternatively, at step 220, the configuration engine 110 may generate or add an instead-of-update to the view. For example, referring to FIG. 2C, the configuration engine 110 may execute the instead-of-update trigger for updating data in the dataset, via the view, by selecting RT_[TABNAME] with the KV values (e.g., via an SQL SELECT condition on the key fields or data fields) at step 221. Then, at steps 222-223, for all entries descending in KV, the configuration engine 110 may increment each version number in a dataset by one (e.g., add one) and upsert the values in RT_[TABNAME]. For example, the configuration engine 110 may start with the highest version number, and increment the version number by 1, repeating for all entries descending in KV (e.g., select value KV=10, add 1 to KV, and upsert the value to 11; select value KV=9, add 1, and upsert the value to 10, . . . select value 0, add 1, and upsert the value to 1, leaving the first entry free). This results in an automatic renumbering of the values to one version up. At step 224, the configuration engine 110 may add a new version number zero (e.g., KV=0) to the dataset. At step 225, the configuration engine 110 may insert new data to the database table, with version 0 being the newest version.

Additionally or alternatively, at step 230, the configuration engine 110 may generate an instead-of-delete trigger to the view. For example, referring to FIG. 2D, at steps 231-233, the configuration engine 110 may execute an instead-of trigger for deleting data in the database table via the view by incrementing each version number in the dataset by one.

At step 250, the configuration engine 110 may simulate the versioned database using the one or more triggering components.

Figure 2E:
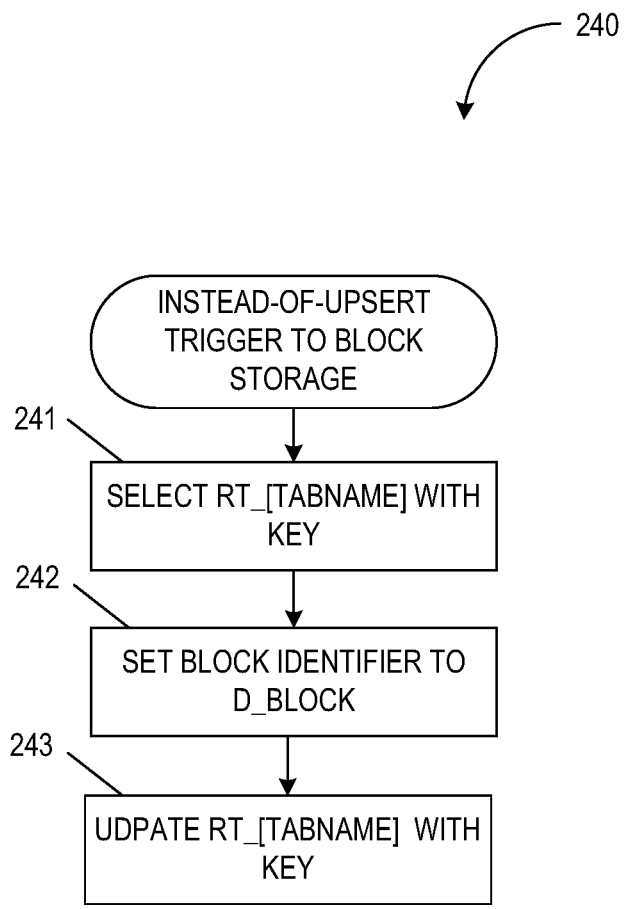
FIG. 2E depicts a flowchart illustrating a process for implementing a triggering component associated with automated versioning of configuration tables with rollback, in accordance with some example embodiments.

FIG. 2E illustrates an instead-of-upsert trigger to block storage. In some embodiments, the configuration engine 110 may trigger the modification of a block recording table in block storage. The after-insert/after-update triggers, which are fired after insert/update operations are executed, include a block identifier (e.g., transport key) and a key of the database view. At steps 241-243, the configuration engine 110 may update the corresponding table (e.g., RT_[TABNAME]) with the key and the block identifier (e.g., D_BLOCK)

Figure 3:
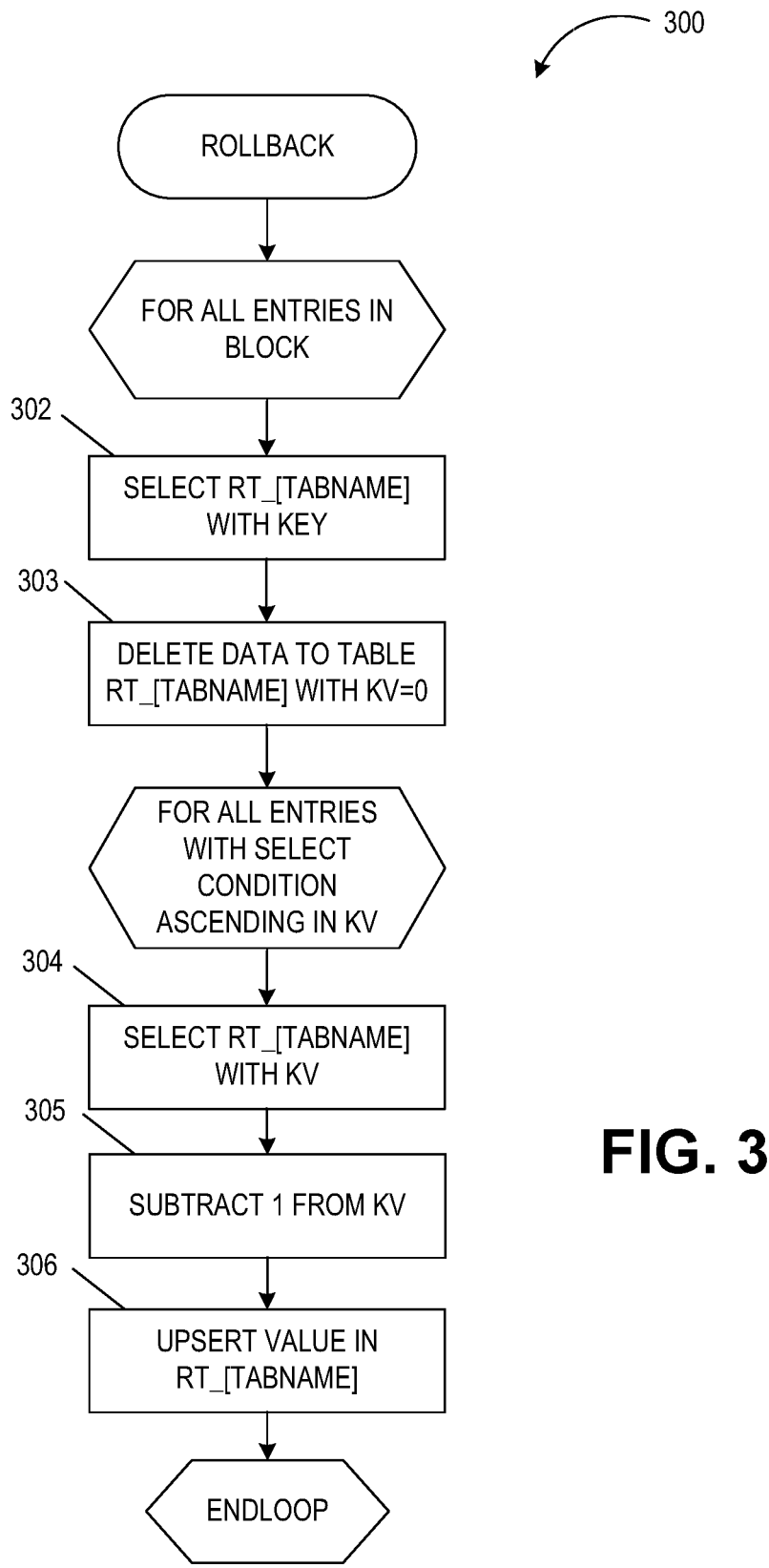
FIG. 3 depicts a flowchart illustrating a process for implementing automated rollback of configuration tables, in accordance with some example embodiments.

FIG. 3 depicts a flowchart illustrating a process for implementing automated rollback of configuration tables. With reference to FIG. 3, at steps 302-303, the configuration engine 110 may retrieve view and key information from a data block and, for each view and key set, delete the dataset with version number zero (e.g., KV=0). Then, the configuration engine 110 may loop over all KV entries (e.g., all the views and keys in the block) and reduce the KV value of the database entry by one, effectively rolling back an entire block (e.g., returning the database to some previous state). For example, at steps 304-306, for all entries ascending in KV, the configuration engine 110 may reduce each version number in a dataset by one (e.g., subtract one) and upsert the values in RT_[TABNAME]. For example, the configuration engine 110 may start with the lowest version number, and decrease the version number by 1, repeating for all entries ascending in KV (e.g., select value KV=1, subtract 1 from KV, and upsert the value 0; select value KV=2, subtract 1, and upsert the value 1, . . . select value 10, subtract 1, and upsert the value 9, etc.). This results in an automatic renumbering of the values to one version lower. If no record is there, the delete operation may be rejected.

Figure 4:
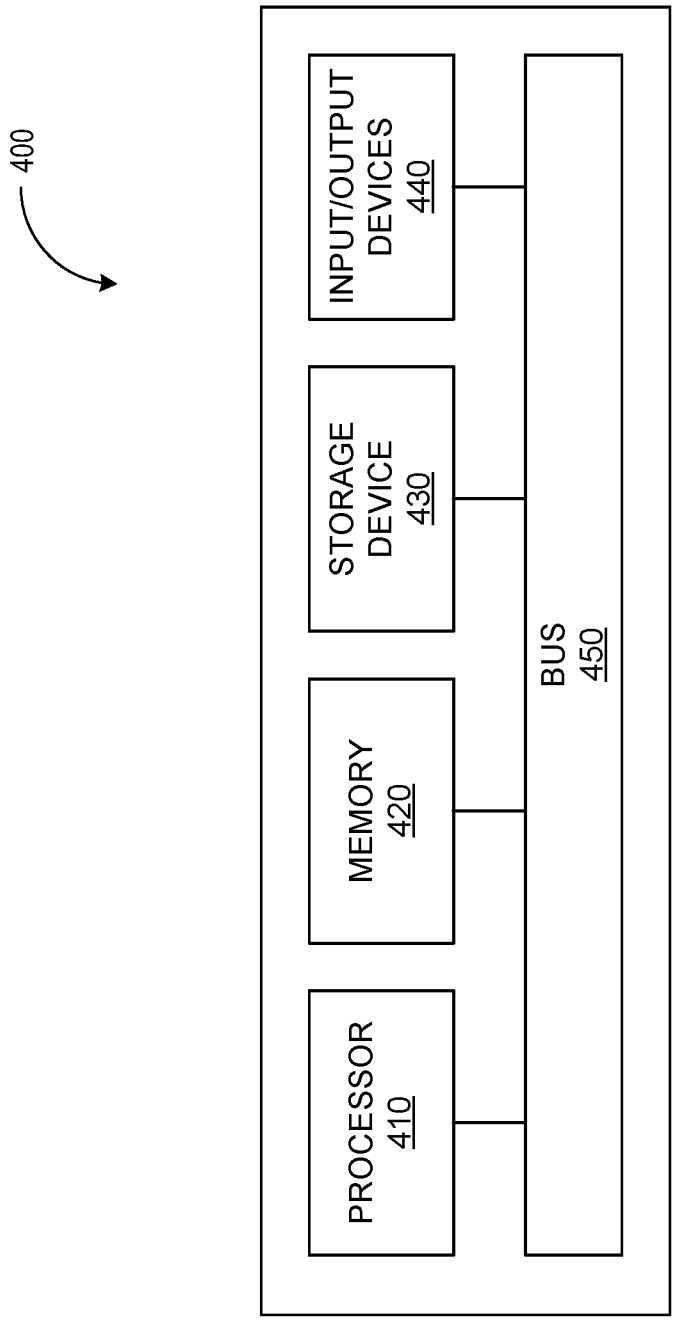
FIG. 4 depicts a block diagram illustrating a computing system, in accordance with some example embodiments.

FIG. 4 depicts a block diagram illustrating a computing system 400 consistent with implementations of the current subject matter. Referring to FIGS. 1-4, the computing system 400 can be used to implement the configuration engine 110 and/or any components therein.

As shown in FIG. 4, the computing system 400 can include a processor 410, a memory 420, a storage device 430, and input/output devices 440. The processor 410, the memory 420, the storage device 430, and the input/output devices 440 can be interconnected via a system bus 450. The processor 410 is capable of processing instructions for execution within the computing system 400. Such executed instructions can implement one or more components of, for example, the configuration engine 110. In some implementations of the current subject matter, the processor 410 can be a single-threaded processor. Alternately, the processor 410 can be a multi-threaded processor. The processor 410 is capable of processing instructions stored in the memory 420 and/or on the storage device 430 to display graphical information for a user interface provided via the input/output device 440.

The memory 420 is a computer readable medium such as volatile or non-volatile that stores information within the computing system 400. The memory 420 can store data structures representing configuration object databases, for example. The storage device 430 is capable of providing persistent storage for the computing system 400. The storage device 430 can be a solid-state device, a floppy disk device, a hard disk device, an optical disk device, a tape device, and/or any other suitable persistent storage means. The input/output device 440 provides input/output operations for the computing system 400. In some implementations of the current subject matter, the input/output device 440 includes a keyboard and/or pointing device. In various implementations, the input/output device 440 includes a display unit for displaying graphical user interfaces.

According to some implementations of the current subject matter, the input/output device 440 can provide input/output operations for a network device. For example, the input/output device 440 can include Ethernet ports or other networking ports to communicate with one or more wired and/or wireless networks (e.g., a local area network (LAN), a wide area network (WAN), the Internet).

In some implementations of the current subject matter, the computing system 400 can be used to execute various interactive computer software applications that can be used for organization, analysis and/or storage of data in various (e.g., tabular) format (e.g., Microsoft Excel®, and/or any other type of software). Alternatively, the computing system 400 can be used to execute any type of software applications. These applications can be used to perform various functionalities, e.g., planning functionalities (e.g., generating, managing, editing of spreadsheet documents, word processing documents, and/or any other objects, etc.), computing functionalities, communications functionalities, etc. The applications can include various add-in functionalities (e.g., SAP Integrated Business Planning add-in for Microsoft Excel as part of the SAP Business Suite, as provided by SAP SE, Walldorf, Germany) or can be stand-alone computing products and/or functionalities. Upon activation within the applications, the functionalities can be used to generate the user interface provided via the input/output device 440. The user interface can be generated and presented to a user by the computing system 400 (e.g., on a computer screen monitor, etc.).

One or more aspects or features of the subject matter described herein can be realized in digital electronic circuitry, integrated circuitry, specially designed ASICs, field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example, as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including acoustic, speech, or tactile input. Other possible input devices include touch screens or other touch-sensitive devices such as single or multi-point resistive or capacitive track pads, voice recognition hardware and software, optical scanners, optical pointers, digital image capture devices and associated interpretation software, and the like.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

In view of the above-described implementations of subject matter this application discloses the following list of examples, wherein one feature of an example in isolation or more than one feature of said example taken in combination and, optionally, in combination with one or more features of one or more further examples are further examples also falling within the disclosure of this application:

Example 1: A system, comprising:
at least one data processor; and
at least one memory storing instructions, which when executed by the at least one data processor, result in operations comprising:
retrieving a database table comprising a dataset including key fields and data fields;
extending the database table by adding a new key field to each row of the database table, wherein the new key field includes a version number and a data block identifier;
generating a view of the database table, wherein the view is a relation defined in terms of stored base tables;
initializing the view of the database table by setting a current version number to zero;
defining one or more triggering components for simulating a versioned database, wherein the one or more triggering components include one or more instead-of triggers used to insert, update, or delete from the database table upon an insert, update, or delete operation on the view; and
simulating the versioned database using the one or more triggering components, including executing a first instead-of trigger for updating data in the dataset, via the view, by:
incrementing each version number in a dataset by one,
adding a new version number zero to the dataset, and inserting new data to the database table.

Example 2: The system of Example 1, further comprising:
executing a second instead-of trigger for inserting data into the database table via the view by adding a version number zero to the dataset; and
inserting the data to the database table.

Example 3: The system of any of Examples 1-2, further comprising:
executing a third instead-of trigger for deleting data in the database table via the view by incrementing each version number in the dataset by one.

Example 4: The system of any of Examples 1-3, further comprising returning a data block to a previous state by:
retrieving view and key information from the data block; and
for each view and key set in the data block, deleting the dataset with version number zero and reduce the version number of each entry in the dataset by one.

Example 5: The system of any of Examples 1-4, wherein each row of the database table is associated with a different version number.

Example 6: The system of any of Examples 1-5, wherein the key fields identify unique records in a data store.

Example 7: The system of any of Examples 1-6, wherein the data block identifier uniquely identifies an associated data block in a data repository.

Example 8: The system of any of Examples 1-7, wherein the database table comprises a relational database table.

Example 9: A computer-implemented method, comprising:

retrieving a database table comprising a dataset including key fields and data fields;
extending the database table by adding a new key field to each row of the database table, wherein the new key field includes a version number and a data block identifier;
generating a view of the database table, wherein the view is a relation defined in terms of stored base tables;
initializing the view of the database table by setting a current version number to zero;
defining one or more triggering components for simulating a versioned database, wherein the one or more triggering components include one or more instead-of triggers used to insert, update, or delete from the database table upon an insert, update, or delete operation on the view; and
simulating the versioned database using the one or more triggering components, including executing a first instead-of trigger for updating data in the dataset, via the view, by:
incrementing each version number in a dataset by one, adding a new version number zero to the dataset, and inserting new data to the database table.

Example 10: The method of Example 9, further comprising:
executing a second instead-of trigger for inserting data into the database table via the view by adding a version number zero to the dataset; and
inserting the data to the database table.

Example 11: The method of any of Examples 9-10, further comprising:
executing a third instead-of trigger for deleting data in the database table via the view by incrementing each version number in the dataset by one.

Example 12: The method of any of Examples 9-11, further comprising returning a data block to a previous state by:
retrieving view and key information from the data block; and
for each view and key set in the data block, deleting the dataset with version number zero and reduce the version number of each entry in the dataset by one.

Example 13: The method of any of Examples 9-12, wherein each row of the database table is associated with a different version number.

Example 14: The method of any of Examples 9-13, wherein the key fields identify unique records in a data store.

Example 15: The method of any of Examples 9-14, wherein the data block identifier uniquely identifies an associated data block in a data repository.

Example 16: The method of Examples 9-15, wherein the database table comprises a relational database table.

Example 17: A non-transitory computer readable storage medium storing instructions, which when executed by at least one data processor, result in operations comprising:
retrieving a database table comprising a dataset including key fields and data fields;
extending the database table by adding a new key field to each row of the database table, wherein the new key field includes a version number and a data block identifier;
generating a view of the database table, wherein the view is a relation defined in terms of stored base tables;
initializing the view of the database table by setting a current version number to zero;
defining one or more triggering components for simulating a versioned database, wherein the one or more triggering components include one or more instead-of triggers used to insert, update, or delete from the database table upon an insert, update, or delete operation on the view; and
simulating the versioned database using the one or more triggering components, including executing a first instead-of trigger for updating data in the dataset, via the view, by:
incrementing each version number in a dataset by one, adding a new version number zero to the dataset, and inserting new data to the database table.

Example 18: The non-transitory computer readable storage medium of Example 17, wherein the instructions, when executed by the at least one data processor, further result in operations comprising:
executing a second instead-of trigger for inserting data into the database table via the view by adding a version number zero to the dataset; and
inserting the data to the database table.

Example 19: The non-transitory computer readable storage medium of any of Examples 17-18, wherein the instructions, when executed by the at least one data processor, further result in operations comprising:
executing a third instead-of trigger for deleting data in the database table via the view by incrementing each version number in the dataset by one.

Example 20: The non-transitory computer readable storage medium of any of Examples 17-19, wherein the instructions, when executed by the at least one data processor, further result in operations comprising:
retrieving view and key information from the data block; and
for each view and key set in the data block, deleting the dataset with version number zero and reduce the version number of each entry in the dataset by one.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. For example, the logic flows may include different and/or additional operations than shown without departing from the scope of the present disclosure. One or more operations of the logic flows may be repeated and/or omitted without departing from the scope of the present disclosure. Other implementations may be within the scope of the following claims.

What is claimed is:
1. A system, comprising:
at least one data processor; and
at least one memory storing instructions, which when executed by the at least one data processor, result in operations comprising:
retrieving a database table comprising a dataset including key fields and data fields;

extending the database table by adding a new key field to each row of the database table, wherein the new key field includes a version number and a data block identifier;

generating a view of the database table, wherein the view is a relation defined in terms of stored base tables;

initializing the view of the database table by setting a current version number to zero;

defining one or more triggering components for simulating a versioned database, wherein the one or more triggering components include one or more instead-of triggers used to insert, update, or delete from the database table upon an insert, update, or delete operation on the view; and simulating the versioned database using the one or more triggering components, including executing a first instead-of trigger for updating data in the dataset, via the view, by:
incrementing each version number in a dataset by one,
adding a new version number zero to the dataset, and
inserting new data to the database table.

2. The system of claim 1, further comprising:
executing a second instead-of trigger for inserting data into the database table via the view by adding a version number zero to the dataset; and
inserting the data to the database table.

3. The system of claim 1, further comprising:
executing a third instead-of trigger for deleting data in the database table via the view by incrementing each version number in the dataset by one.

4. The system of claim 1, further comprising returning a data block to a previous state by:
retrieving view and key information from the data block; and
for each view and key set in the data block, deleting the dataset with version number zero and reduce the version number of each entry in the dataset by one.

5. The system of claim 1, wherein each row of the database table is associated with a different version number.

6. The system of claim 1, wherein the key fields identify unique records in a data store.

7. The system of claim 1, wherein the data block identifier uniquely identifies an associated data block in a data repository.

8. The system of claim 1, wherein the database table comprises a relational database table.

9. A computer-implemented method, comprising:
retrieving a database table comprising a dataset including key fields and data fields;

extending the database table by adding a new key field to each row of the database table, wherein the new key field includes a version number and a data block identifier;

generating a view of the database table, wherein the view is a relation defined in terms of stored base tables;

initializing the view of the database table by setting a current version number to zero;

defining one or more triggering components for simulating a versioned database, wherein the one or more triggering components include one or more instead-of triggers used to insert, update, or delete from the database table upon an insert, update, or delete operation on the view; and simulating the versioned database using the one or more triggering components, including executing a first instead-of trigger for updating data in the dataset, via the view, by:
incrementing each version number in a dataset by one,
adding a new version number zero to the dataset, and
inserting new data to the database table.

10. The method of claim 9, further comprising:
executing a second instead-of trigger for inserting data into the database table via the view by adding a version number zero to the dataset; and
inserting the data to the database table.

11. The method of claim 9, further comprising:
executing a third instead-of trigger for deleting data in the database table via the view by incrementing each version number in the dataset by one.

12. The method of claim 9, further comprising returning a data block to a previous state by:
retrieving view and key information from the data block; and
for each view and key set in the data block, deleting the dataset with version number zero and reduce the version number of each entry in the dataset by one.

13. The method of claim 9, wherein each row of the database table is associated with a different version number.

14. The method of claim 9, wherein the key fields identify unique records in a data store.

15. The method of claim 9, wherein the data block identifier uniquely identifies an associated data block in a data repository.

16. The method of claim 9, wherein the database table comprises a relational database table.

17. A non-transitory computer readable storage medium storing instructions, which when executed by at least one data processor, result in operations comprising:
retrieving a database table comprising a dataset including key fields and data fields;

extending the database table by adding a new key field to each row of the database table, wherein the new key field includes a version number and a data block identifier;

generating a view of the database table, wherein the view is a relation defined in terms of stored base tables;

initializing the view of the database table by setting a current version number to zero;

defining one or more triggering components for simulating a versioned database, wherein the one or more triggering components include one or more instead-of triggers used to insert, update, or delete from the database table upon an insert, update, or delete operation on the view; and simulating the versioned database using the one or more triggering components, including executing a first instead-of trigger for updating data in the dataset, via the view, by:
incrementing each version number in a dataset by one,
adding a new version number zero to the dataset, and
inserting new data to the database table.

18. The non-transitory computer readable storage medium of claim 17, wherein the instructions, when executed by the at least one data processor, further result in operations comprising:
executing a second instead-of trigger for inserting data into the database table via the view by adding a version number zero to the dataset; and
inserting the data to the database table.

19. The non-transitory computer readable storage medium of claim 17, wherein the instructions, when executed by the at least one data processor, further result in operations comprising:
   executing a third instead-of trigger for deleting data in the database table via the view by incrementing each version number in the dataset by one.

20. The non-transitory computer readable storage medium of claim 17, wherein the instructions, when executed by the at least one data processor, further result in operations comprising:
   retrieving view and key information from the data block; and
   for each view and key set in the data block, deleting the dataset with version number zero and reduce the version number of each entry in the dataset by one.

\* \* \* \* \*